(12) United States Patent  
Wright (10) Patent No.: US 12,509,211 B2
(45) Date of Patent: Dec. 30, 2025

(54) DEFLECTOR SHIELD AND SUPPORT MEMBER DEVICE FOR AN AIRCRAFT

(71) Applicant: The Boeing Company, Arlington, VA (US)

(72) Inventor: Robert Steven Wright, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/601,057

(22) Filed: Mar. 11, 2024

(65) Prior Publication Data

US 2025/0282467 A1    Sep. 11, 2025

(51) Int. Cl.
*B64C 3/18* (2006.01)
*B64D 45/00* (2006.01)

(52) U.S. Cl.
CPC ............... *B64C 3/18* (2013.01); *B64D 45/00* (2013.01)

(58) Field of Classification Search
CPC .. B64C 3/18; B64C 3/58; B64C 23/00; B64C 39/068
See application file for complete search history.

(56) References Cited

U.S. PATENT DOCUMENTS

| | | | | | |
|---|---|---|---|---|---|
| 1,779,005 | A | * | 10/1930 | Lanier | B64C 39/00 244/36 |
| 1,933,001 | A | * | 10/1933 | Bellanca | B64C 39/068 244/37 |
| 2,090,775 | A | * | 8/1937 | Wright | B64C 3/18 244/130 |
| 5,810,287 | A | * | 9/1998 | O'Boyle | B64C 3/32 60/797 |
| 6,073,889 | A | * | 6/2000 | Dees | B64C 3/50 244/214 |
| 8,141,815 | B1 | * | 3/2012 | Hoisington | B64C 39/068 244/37 |
| 9,481,450 | B2 | * | 11/2016 | Pitt | B64C 3/52 |
| 9,938,901 | B2 | * | 4/2018 | Bodard | B64D 29/02 |
| 10,974,808 | B2 | * | 4/2021 | Harrison | B64C 23/04 |
| 11,787,524 | B2 | * | 10/2023 | Grip | B64C 3/14 244/129.1 |
| 12,195,179 | B2 | * | 1/2025 | Grip | B64C 1/26 |
| 2014/0290270 | A1 | * | 10/2014 | Bodard | F02C 7/20 60/797 |
| 2014/0374566 | A1 | * | 12/2014 | Fernando | B64D 27/14 248/554 |
| 2016/0001874 | A1 | * | 1/2016 | Pitt | B64C 3/18 244/99.11 |

(Continued)

*Primary Examiner* — Joseph W Sanderson
(74) *Attorney, Agent, or Firm* — COATS & BENNETT, PLLC (57) ABSTRACT

A device to control movement of fluid that is emitted from an aircraft engine that is mounted to a wing of an aircraft. The device includes a support member positioned on an exterior of the aircraft and having an elongated shape with a first end connected to the wing and a second end connected to the fuselage. The support member has a first sectional size. A deflector shield is mounted to the support member and positioned on the exterior of the aircraft. The deflector shield has a larger sectional size than the support member. The deflector shield has an outer edge that extends around the support member and is positioned radially outward from the support member.

20 Claims, 6 Drawing Sheets

(56) References Cited

U.S. PATENT DOCUMENTS

| 2019/0291846 A1* | 9/2019 | Harrison | B64C 1/26 |
| 2023/0140102 A1* | 5/2023 | Grip | B64C 1/26 |
| | | | 244/129.1 |
| 2024/0150007 A1* | 5/2024 | Grip | B64C 1/26 |

* cited by examiner

DEFLECTOR SHIELD AND SUPPORT MEMBER DEVICE FOR AN AIRCRAFT

TECHNOLOGICAL FIELD

The present disclosure relates generally to the field of aircraft and, more specifically, to devices and methods to prevent fluid that is emitted from an engine from reaching potential ignition sources.

BACKGROUND

Aircraft generally include a fuselage configured to hold flight personnel and also cargo and/or passengers. Wings extend outward from the fuselage and one or more engines may be mounted to the wings to propel the aircraft during flight. In some aircraft, one or more support members extend between the wings and the fuselage to support the wings. For example, a high wing aircraft may include trusses that extend between the underside of the wings and the fuselage.

Flammable fluid such as but not limited one or more of fuel and hydraulic fluid can leak from the engines during flight. During flight, the fluid is emitted from the engines and enters the airflow behind the engines due to the speed of the aircraft. The support members are positioned aft of the engines such that the fluid impinges upon the support members. The shape and orientation of the support members can cause the fluid to migrate along the support members and eventually reach an ignition source. For example, the fluid could move along the support member to the fuselage and enter into the wheel well and into contact with the brakes of the landing gear which could have an elevated temperature. In another example, the fluid could move along the support member to the wing and move into contact with a wingtip light.

A solution is needed to stop the migration of fluid along the support members to prevent the fluid from reaching an ignition source. The solution should prevent the migration of the fluid and cause the fluid to run off the aircraft and enter the airflow.

SUMMARY

One aspect is directed to a device to control the movement of fluid that is emitted from an aircraft engine that is mounted to a wing of an aircraft. The device comprises a support member positioned on an exterior of the aircraft and comprising an elongated shape with a first end connected to the wing and a second end connected to the fuselage and with the support member comprising a first sectional size. A deflector shield is mounted to the support member and positioned on the exterior of the aircraft. The deflector shield comprises a larger sectional size than the support member. The deflector shield comprises an outer edge that extends around the support member and is positioned radially outward from the support member.

In another aspect, the deflector shield comprises: an outer face that faces towards the first end of the support member; an inner face that faces towards the second end of the support member; an outer edge that is positioned between the outer face and the inner face; and wherein the outer edge comprises a rounded shape.

In another aspect, the outer face and the inner face are each flat and aligned parallel to one another.

In another aspect, a center line of the deflector shield that extends through a forward end and a rear end is aligned perpendicular to a center line of the support member.

In another aspect, a center line of the deflector shield that extends through a forward end and a rear end is aligned transverse to a center line of the support member and configured to be aligned parallel to an airflow direction of the aircraft during flight.

In another aspect, the deflector shield has an oval shape with a height of the deflector shield greater at a rear end of the deflector shield than at an upper section of the deflector shield.

In another aspect, the deflector shield comprises an opening contained within the outer edge and with the opening sized to receive the support member.

In another aspect, a seal is positioned around the opening with the seal configured to fill gaps formed between the deflector shield and the support member to prevent the fluid from passing beyond the deflector shield.

In another aspect, the support member and the deflector shield comprise a one-piece unitary construction.

In another aspect, the support member is configured to be aligned at a downward angle with the first end positioned vertically above the second end during level flight of the aircraft.

One aspect is directed to a device to control the movement of fluid that are emitted from an aircraft engine that is mounted to a wing of an aircraft. The device comprises a support member positioned on an exterior of the aircraft. A deflector shield is mounted to the support member and positioned on the exterior of the aircraft. The deflector shield comprises: an outer face that faces towards the wing; an inner face that faces towards the fuselage; and an outer edge that is positioned between the outer face and the inner face. The deflector shield comprises a larger sectional size than the support member with the outer edge spaced radially outward from the support member continuously around the support member.

In another aspect, the deflector shield is centered on the support member.

In another aspect, the deflector shield is a first deflector shield and further comprising a second deflector shield mounted to the support member on the exterior of the aircraft and spaced along the support member away from the first deflector shield.

In another aspect, the deflector shield has an oval shape and extends outward in an aft direction a greater distance than in a forward direction.

In another aspect, the support member comprises a first end that is connected to the wing and a second end that is connected to the fuselage with the support member configured to be aligned in a downward orientation with the first end vertically higher than the second end during level flight of the aircraft.

In another aspect, the deflector shield is aligned perpendicular to the support member.

In another aspect, the deflector shield is aligned transverse to the support member and aligned parallel to an airflow direction of the aircraft during flight.

In another aspect, the deflector shield is sized for a rear end of the deflector shield to be outside of a boundary layer of air flowing past the aircraft during flight.

One aspect is directed to a method of preventing fluid from an engine of an aircraft that is mounted to a wing from running along a support member that supports the wing. The method comprises: positioning a deflector shield at a point along the support member on an exterior of the aircraft; and attaching the deflector shield to the support member at the point and preventing the deflector shield from moving during flight.

In another aspect, the method further comprises positioning an outer edge of the deflector shield outside of the boundary layer of the aircraft to enable the fluid that flows along the deflector shield to be expelled into the airflow.

The features, functions and advantages that have been discussed can be achieved independently in various aspects or may be combined in yet other aspects, further details of which can be seen with reference to the following description and the drawings.

DETAILED DESCRIPTION

Figure 1:
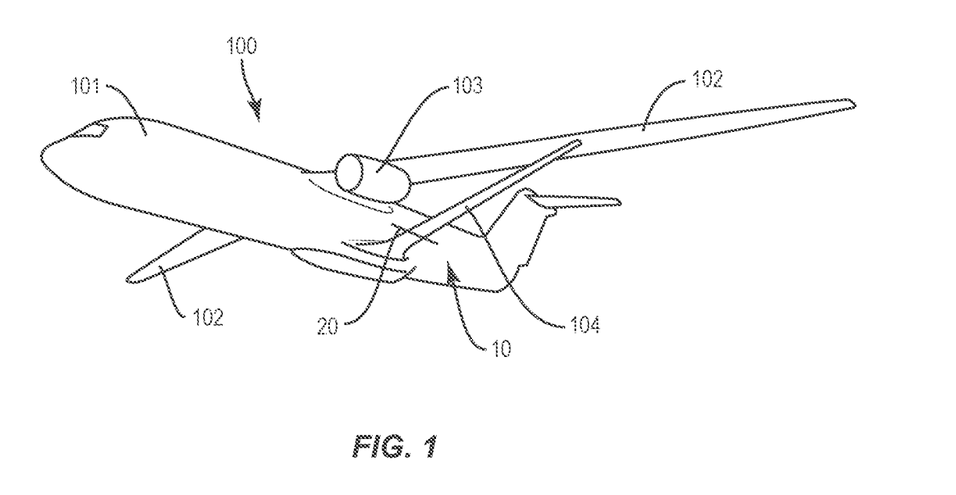
FIG. 1 is an isometric view of an aircraft.

FIG. 1 illustrates an aircraft 100 that includes a fuselage 101 configured to accommodate passengers and/or cargo. Wings 102 extend outward from the fuselage 101 and engines 103 are mounted to the wings 102. Support members 104 on the exterior of the aircraft 100 support the wings 102. In some examples, the support member 104 are trusses that extend between the fuselage 101 and support the wings 102. FIG. 1 illustrates a high-wing aircraft 100 with the support members 104 extending from a lower section of the fuselage 101 to the underside of the wings 102. During use the engines 103 emit various flammable fluid such as but not limited to one or more of turbine oil, fuel, hydraulic fluid, and lubricating oil. In some examples, this fluid leaks from the engines 103 with other examples including the fluid being emitted in the engine exhaust during flight.

Figure 2A:
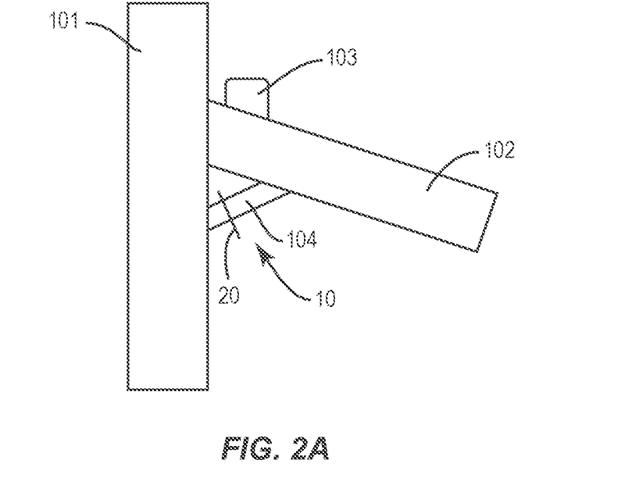
FIG. 2A is a top schematic view of a deflector shield attached to a support member of an aircraft.
Figure 2B:
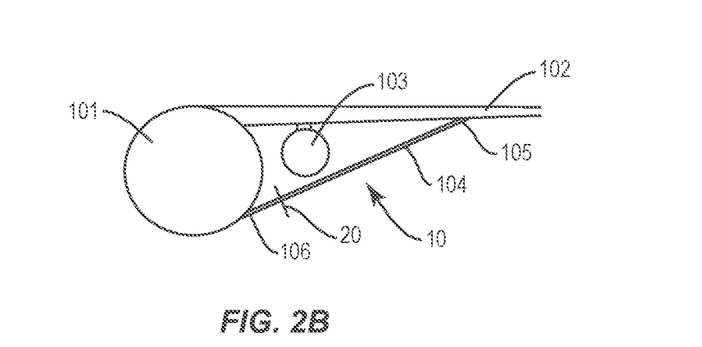
FIG. 2B is a front schematic view of a deflector shield attached to a support member of an aircraft.
Figure 2C:
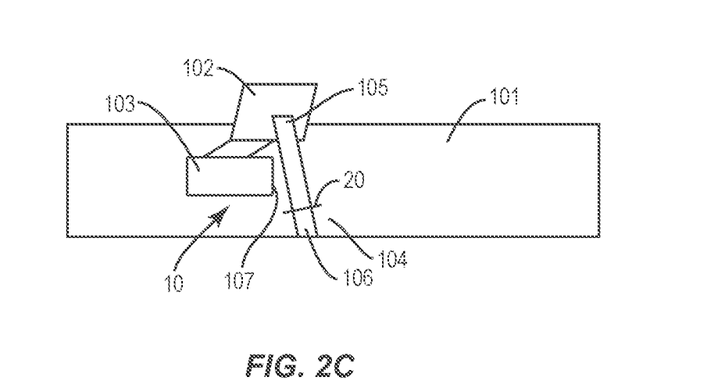
FIG. 2C is a side schematic view of a deflector shield attached to a support member of an aircraft.

FIGS. 2A, 2B, and 2C illustrate various schematic views of a device 10 comprising the support member 104 and a deflector shield 20. The support member 104 has an elongated shape and extends between the wings 102 and the fuselage 101. The support member 104 can have a straight shape or can be curved along the entirety or along one or more sections. A first end 105 is connected to the wing 102 and a second end 106 is connected to the fuselage 101. In one example, the first end 105 is connected to the underside of the wing 102 and the second end 106 is connected to a lower section of the fuselage 101. The support member 104 is aligned in a downward slope with the first end 105 vertically above the second end 106 during level flight. In other examples, the support member 104 is aligned in different angular orientations, such as an upward slope with the first end 105 vertically lower than the second end 106, or in a substantially flat orientation.

The engine 103 is mounted underneath the wing 102 and forward of the support member 104. FIG. 2C clearly illustrates this positioning with a trailing end 107 of the engine 103 positioned forward of the support member 104. Fluid that is emitted from the engine 103 during flight contacts against and collects on the support member 104. The fluid accumulates and runs downward along the support member 104 towards the fuselage 101 due to the downward slope. Additionally or alternatively, the fluid accumulates and moves upward along the support member 104 towards the wing 102 due to the force of the air flow.

A deflector shield 20 is positioned along the support member 104 to block the fluid as it moves along the support member 104. The deflector shield 20 extends radially outward beyond the support member 104 to prevent the fluid from migrating along the support member 104. The deflector shield 20 also causes the fluid to be dispersed into the airstream and away from the aircraft 100 during flight.

The deflector shield 20 is positioned at various points along the support member 104. In some examples as illustrated in FIGS. 2A-2C, the deflector shield 20 is positioned between the engine 103 and the fuselage 101. The deflector shield 20 can be positioned at various points along the support member 104 and different distances away from the fuselage 101 and the engine 103. In some examples, the deflector shield 20 is positioned in closer proximity to the fuselage 101 to enable the majority or all of the fluid that contacts the support member 104 to be upstream from the deflector shield 20 (i.e., to be between the deflector shield 20 and the first end 105). In other examples, the deflector shield 20 is positioned in closer proximity to the engine 103 which may enable better access to the fuselage 101. In other examples, the deflector shield 20 is positioned between the engine 103 and the wing 102 to prevent fluid from migrating along the support member 104 and reaching the wing 102.

Figure 3A:
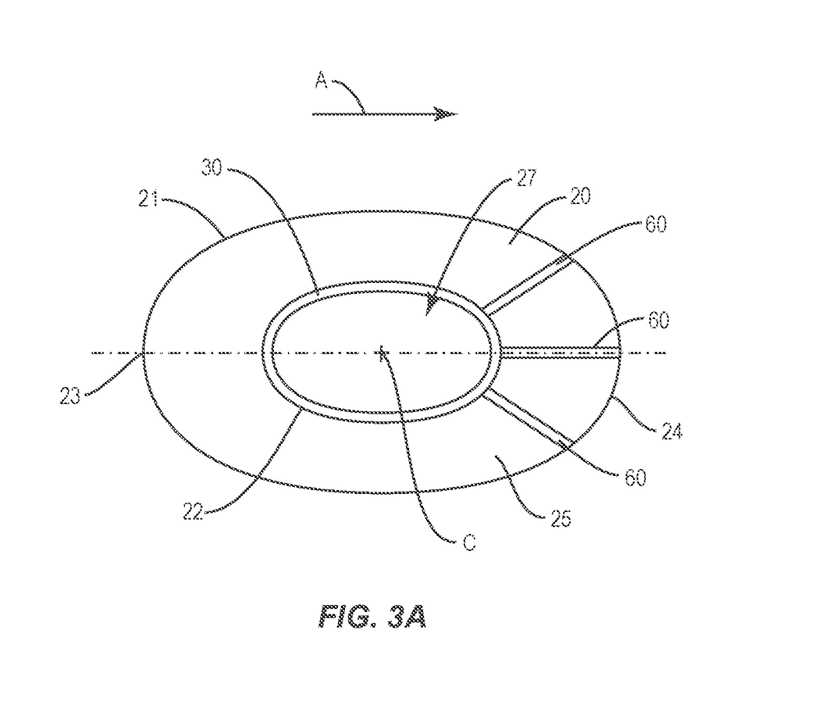
FIG. 3A is a side schematic view of a deflector shield with a seal positioned along an opening.
Figure 3B:
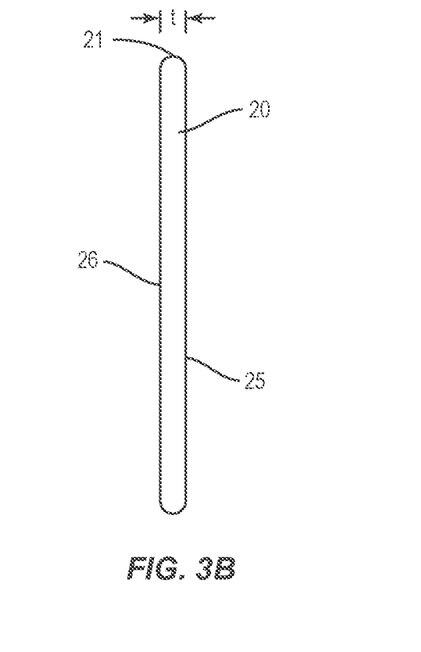
FIG. 3B is a schematic end view of the deflector shield of FIG. 3A.

The deflector shield 20 can include various shapes and sizes. Examples include but are not limited to oval, circular, and polygonal. As illustrated in FIGS. 3A and 3B, the deflector shield 20 includes an outer face 25 that faces outward towards the first end 105 when positioned on the support member 104 and an opposing inner face 26 that faces inward towards the second end 106. In some examples, the faces 25, 26 are flat and substantially parallel with a thickness t measured between the faces 25, 26 being substantially constant throughout the deflector shield 20. In other examples, one or both faces 25, 26 have a curved shape. In one example, the thickness t is larger towards the inner edge 22 and decreases towards the outer edge 21 to cause the fluid to move towards the outer edge 21. In some examples, one or more channels 60 are positioned in the outer face 25. The channels 60 are recessed below the remainder of the outer face 25 and provide for collecting and directing the fluid towards the outer edge 21. In some examples as illustrated in FIG. 3A, the channels 60 are positioned just along the aft section 24 of the outer face 25. This is because during flight the airflow forces the fluid along the channels 60 towards the aft edge of the deflector shield 20. In other examples, channels 60 are positioned throughout the outer face 25 including both the aft section 24 and the forward section 23.

The outer edge 21 is continuous and extends completely around the support member 104. In some examples as illustrated in FIG. 3B, the outer edge 21 has a rounded shape to prevent injuring a person on the ground that could come in contact with the deflector shield 20. In other examples, the outer edge 21 has a square edge or a steeper pointed edge.

The outer edge 21 is configured to prevent the fluid from migrating along one of the faces 25, 26, over the outer edge 21, and along the other face to the support member 104. In some examples, the outer edge 21 has a rounded shape with a relatively small radius to prevent the migration across the outer edge 21. The small radius causes the fluid to be emitted into the airstream during flight, instead of migrating to the inner face 26.

In some examples, the deflector shield 20 is separate from the support member 104. The deflector shield 20 includes an opening 27 to receive the support member 104. The opening 27 can be aligned at a center point C of the deflector shield 20 as illustrated in FIG. 3A, or can be offset from the center point C. The deflector shield 20 is connected to the support member 104 in various manners including but not limited to mechanical fasteners, adhesives, and weld joints. A seal 30 can extend around the opening 27 to fill gaps that are formed between the inner edge 22 of the deflector shield 20 and the support member 104. In other examples, the deflector shield 20 and the support member 104 have a unitary, one-piece construction with the integral construction not requiring separate connectors.

Figure 4:
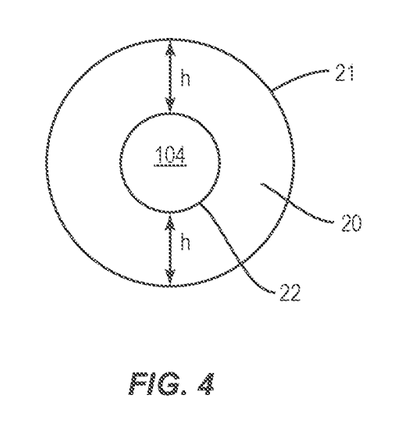
FIG. 4 is a schematic side view of a deflector shield.
Figure 5:
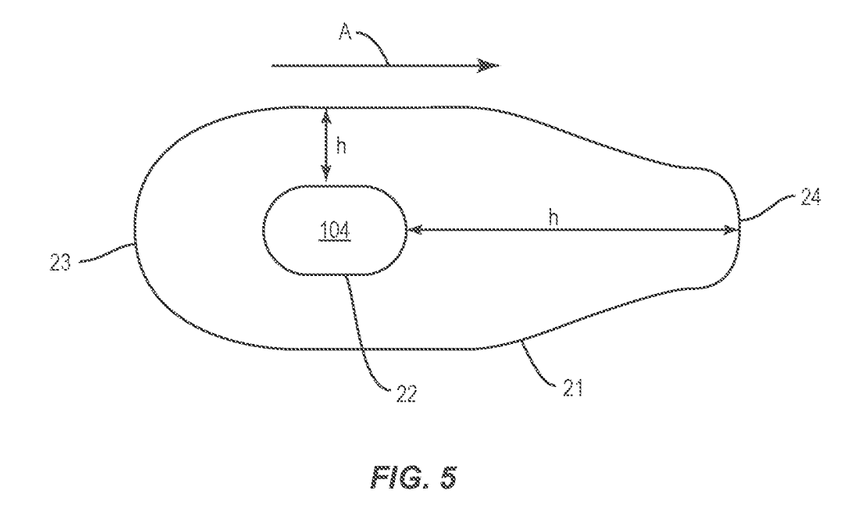
FIG. 5 is a schematic side view of a deflector shield.

The deflector shield 20 extends radially outward beyond the support member 104. As illustrated in FIG. 4, the deflector shield 20 includes a height h measured in a radial direction between the inner edge 22 and the outer edge 21. In some examples as illustrated in FIG. 4, the height h is the same throughout the deflector shield 20. In other examples as illustrated in FIG. 5, the height h differs around the deflector shield 20. FIG. 5 includes the height h at the aft section 24 being greater than other sections of the deflector shield 20.

In some examples, the height h is sized to position the outer edge 21 beyond the boundary layer of the aircraft 100. This enables the fluid that moves along the outer face 25 to the outer edge 21 to be expelled into the airstream and dispersed away from the aircraft 100. In some examples, the height h is at least 25% taller than a maximum fluid piling that could accumulate at the deflector blade 20. The maximum fluid piling is determined based on the flow rate, viscosity, and surface tension of the fluid. In some examples, the height h is at least 25% taller than the boundary layer of the aircraft 100.

In some examples, the entire outer edge 21 of the deflector shield 20 is positioned outward beyond the boundary layer. In other examples as illustrated in FIG. 5 just the aft section 24 has a height h that extends outward beyond the boundary layer because the fluid is expelled during flight from the aft section 24 due to the force of the air flow acting on the fluid. In some examples, the height h is less than the boundary layer.

Figure 6:
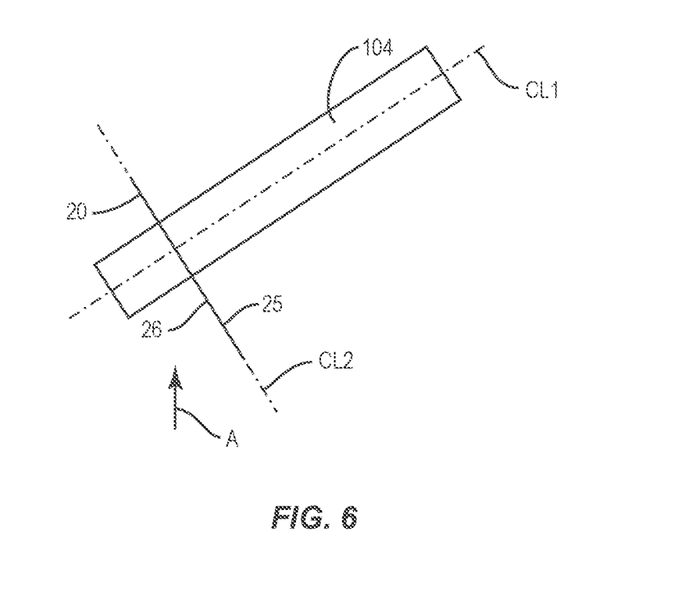
FIG. 6 is a schematic side view of a deflector shield positioned relative to a support member.
Figure 7:
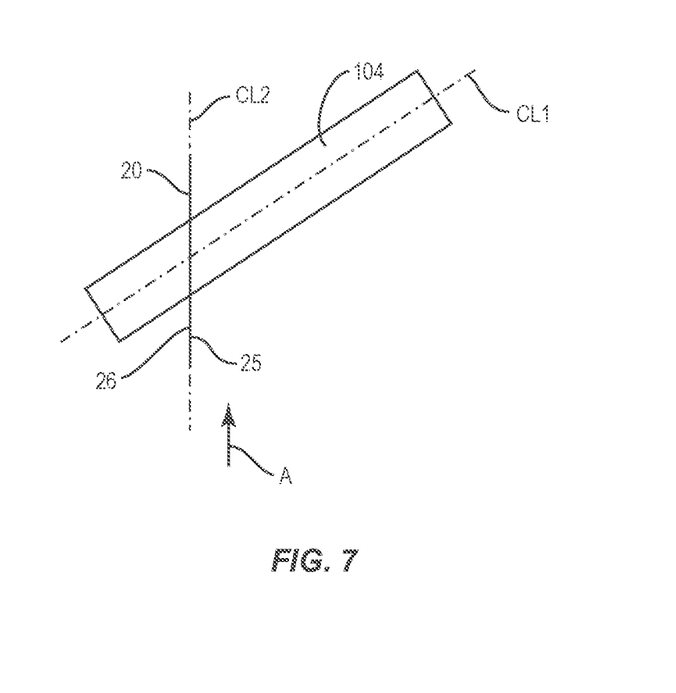
FIG. 7 is a schematic side view of a deflector shield positioned relative to a support member.

The deflector shield 20 is aligned at an angle relative to the support member 104 to act as a dam to stop the flow of fluid along the support member 104. FIG. 6 illustrates an example of the deflector shield 20 perpendicular to the support member 104. A center line CL2 of the deflector shield 20 is perpendicular to the center line CL1 of the support member 104. In some examples, a 90 degree angle turn is formed at the junction of the support member 104 and deflector shield 20. In other examples, the deflector shield is aligned at non-perpendicular angles. FIG. 7 illustrates the deflector shield 20 positioned across the support member 104 at a non-perpendicular angle.

The deflector shield 20 is mounted on an exterior of the aircraft 100. This positioning exposes the deflector shield 20 to large forces caused by the air flow during flight. In some examples as illustrated in FIG. 7, the deflector shield 20 is aligned with the air flow illustrated by arrow A. This alignment includes the center line CL2 parallel with the air flow A. In one example as illustrated in FIG. 7, this parallel alignment with the air flow occurs when the deflector shield 20 is oriented at a non-perpendicular alignment relative to the support member 104. In other examples as illustrated in FIG. 6, the deflector shield 20 is not aligned with the air flow. The deflector shield 20 is aligned for one of the faces 25, 26 to be exposed to the air flow as the deflector shield 20 is not parallel to the air flow.

In some examples, the deflector shield 20 is connected to a support member 104 of an existing aircraft 100. In one example, this includes retrofitting aircraft 100 in the field by positioning and attaching the deflector shield 20 to the support member 104. In some examples, the deflector shield 20 is constructed from two or more sections. The sections are positioned around the perimeter of the support member 104 and then connected together and connected to the support member 104. In another example, the deflector shield 20 includes a slot that extends between the outer edge 21 and the opening 27. To mount the deflector shield 20, the support member 104 is inserted into the slot and then moved to the opening 27. Once positioned, the slot is closed such as by deforming the deflector shield or positioning another member across the slot.

In some examples, the deflector shield 20 is included with the support member 104 during manufacturing of the aircraft 100. This can include the deflector shield 20 and support member 104 manufactured as a single, one-piece construction. This can also include a two-piece construction with the deflector shield 20 attached to the support member 104 during manufacturing.

Figure 8:
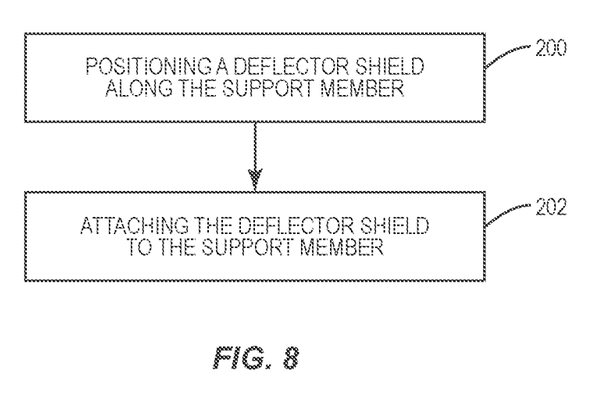
FIG. 8 is a flowchart diagram of a method of preventing fluid from an engine that is mounted on a wing from running along a support member and reaching the fuselage.

FIG. 8 illustrates a method of preventing fluid from an engine 103 mounted on a wing 102 from running along a support member 104 that supports the wing. The method includes positioning a deflector shield 20 at a point along the support member 104 (block 200). In some examples, this includes positioning between the engine 103 and the fuselage 101. In other examples, this includes positioning between the engine 103 and the wing 102. This positioning includes the deflector shield 20 positioned on an exterior of the aircraft 100. The deflector shield 20 is attached to the support member 104 at the point and to prevent the deflector shield 20 from moving during flight (block 202). This placement enables the deflector shield to prevent the fluid from migrating along the support member 104. The fluid runs along the outer face 25 of the deflector shield 20 and is expelled into the airstream. The deflector shield 20 can be mounted by various manners including but not limited to one or more of adhesives and mechanical fasteners.

Figure 9:
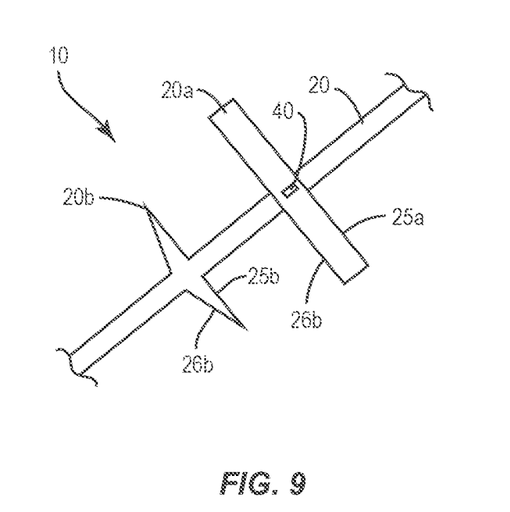
FIG. 9 is a schematic diagram of multiple deflector shields mounted at different points along a support member.

In some examples, a single deflector shield 20 is positioned along the support member 104. In other examples, multiple deflector shields 20 are positioned along the support member. FIG. 9 illustrates a device 10 with two deflector shields 20a, 20b. In this example, the first deflector shield 20a is mounted to the support member 104 with one or more fasteners 40 and the second deflector shield 20b is integrally formed with the support member 104 (i.e., no fasteners). The first deflector shield 20a is larger than the second deflector shield 20b. In examples with multiple deflector shields 20, the different deflector shields 20 can include the same or different construction, size, shape, etc. In another example with multiple deflector shields 20, a first deflector shield 20a is positioned between the engine 103 and the fuselage 101 and a second deflector shield 20b is positioned between the engine 103 and the wing 102.

The device that includes the deflector shield 20 and support member 104 can be used on a variety of aircraft 100. Aircraft 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A device to control movement of fluid that is emitted from an aircraft engine that is mounted to a wing of an aircraft, the device comprising:
    a support member positioned on an exterior of the aircraft and comprising an elongated shape with a first end connected to an underside of the wing aft of the engine and a second end connected to a fuselage, the support member positioned aft of the engine that is mounted to the wing and that receives the fluid that is emitted from the engine, the support member comprising a first sectional size; and
    a deflector shield mounted to the support member and positioned on the exterior of the aircraft completely below the wing, the deflector shield comprising a larger sectional size than the support member to extend radially outward beyond the support member, the deflector shield comprising an outer edge that extends around the support member and is positioned radially outward from the support member, the deflector shield comprising a forward height measured between the support member and a forward end and an aft height measured between the support member and a rear end;
    wherein the aft height is greater than the forward height for the rear end to be positioned beyond a boundary layer of the aircraft to expel the fluid into the airstream.

2. The device of claim 1, wherein the rear end of the deflector shield is positioned aft of the wing.

3. The device of claim 2, wherein an outer face and an inner face of the deflector shield are each flat to enable the fluid to move in an aft direction during flight.

4. The device of claim 1, wherein a center line of the deflector shield that extends through the forward end and the rear end is aligned perpendicular to a center line of the support member.

5. The device of claim 1, wherein a center line of the deflector shield that extends through the forward end and the rear end is aligned transverse to a center line of the support member and aligned parallel to an airflow direction of the aircraft during flight.

6. The device of claim 1, wherein the deflector shield has an oval shape with a height of the deflector shield greater at the rear end of the deflector shield than at an upper section of the deflector shield.

7. The device of claim 1, wherein the deflector shield comprises an opening sized to receive the support member.

8. The device of claim 7, further comprising a seal positioned around the opening, the seal configured to fill gaps formed between the deflector shield and the support member to prevent the fluid from passing beyond the deflector shield.

9. The device of claim 1, wherein the support member and the deflector shield comprise a one-piece unitary construction.

10. The device of claim 1, wherein the support member is configured to be aligned at a downward angle with the first end positioned vertically above the second end during level flight of the aircraft.

11. A device to control movement of fluid that are emitted from an aircraft engine that is mounted to a wing of an aircraft, the device comprising:
    a support member connected to the wing and the fuselage and positioned on an exterior of the aircraft, the support member positioned aft of the engine and receives the fluid that is emitted from the engine;
    a deflector shield mounted to the support member and positioned on the exterior of the aircraft between the engine and the fuselage, the deflector shield comprising:
        an outer face that faces towards the wing;
        an inner face that faces towards the fuselage;
        an outer edge that is positioned between the outer face and the inner face; and
    channels that are recessed in an aft section of the outer face and extend between the support member and the outer edge, the channels configured to collect and direct the fluid towards the rear end;
    wherein the deflector shield comprises a larger sectional size than the support member with the outer edge spaced radially outward from the support member continuously around the support member.

12. The device of claim 11, wherein the deflector shield is positioned completely below the wing.

13. The device of claim 11, wherein the deflector shield is a first deflector shield and further comprising a second deflector shield mounted to the support member on the exterior of the aircraft and spaced along the support member away from the first deflector shield.

14. The device of claim 11, wherein the deflector shield has an oval shape and extends outward in an aft direction a greater distance than in a forward direction.

15. The device of claim 11, wherein the support member comprises a first end that is connected to the wing and a second end that is connected to the fuselage, the support member is configured to be aligned in a downward orientation with the first end vertically higher than the second end during level flight of the aircraft.

16. The device of claim 11, wherein the deflector shield is aligned perpendicular to the support member.

17. The device of claim 11, wherein the deflector shield is aligned transverse to the support member and aligned parallel to an airflow direction of the aircraft during flight.

18. The device of claim 11, wherein the deflector shield is sized for the rear end of the deflector shield to be outside of a boundary layer of air flowing past the aircraft during flight.

19. A method of preventing fluid from an engine of an aircraft that is mounted to a wing from running along a support member that supports the wing, the method comprising:
- connecting a deflector shield to the support member on an exterior of the aircraft between the engine and a fuselage with the support member extending between the wing and the fuselage and with the support member extending aft of the engine; and
- positioning the deflector shield completely below the below the wing and with a rear edge of the deflector shield aft of the wing and outside of a boundary layer of the aircraft to enable the fluid that flows along the deflector shield to be expelled into an airflow.

20. The method of claim 19, further comprising aligning channels that are recessed into a surface of the deflector shield in an airflow direction with a leading end at the channels at the support member and a trailing end of the channels at an edge of the deflector shield to enable the fluid that flows along the channels to be expelled into an airflow.

\* \* \* \* \*